(12) United States Patent
Ahmed

(10) Patent No.: US 8,428,367 B2
(45) Date of Patent: Apr. 23, 2013

(54) SYSTEM AND METHOD FOR ELECTRONIC DOCUMENT CLASSIFICATION

(75) Inventor: Abbas Ahmed, Nasr (EG)

(73) Assignee: International Business Machines Corporation, Armonk, NY (US)

( * ) Notice: Subject to any disclaimer, the term of this patent is extended or adjusted under 35 U.S.C. 154(b) by 863 days.

(21) Appl. No.: 12/241,157

(22) Filed: Sep. 30, 2008

(65) Prior Publication Data

US 2009/0110275 A1  Apr. 30, 2009

(30) Foreign Application Priority Data

Oct. 26, 2007 (EP) ..................................... 07119367

(51) Int. Cl.
*G06K 9/62* (2006.01)

(52) U.S. Cl.
USPC .......................................... 382/209; 382/224

(58) Field of Classification Search ................. None
See application file for complete search history.

(56) References Cited

U.S. PATENT DOCUMENTS

| | | | |
|---|---|---|---|
| 5,619,648 A | 4/1997 | Canale et al. |
| 5,999,932 A | 12/1999 | Paul |
| 6,023,723 A | 2/2000 | McCormick et al. |
| 6,112,227 A | 8/2000 | Heiner |
| 6,161,130 A | 12/2000 | Horvitz et al. |
| 6,199,103 B1 | 3/2001 | Sakaguchi et al. |
| 6,249,805 B1 | 6/2001 | Fleming, III |
| 6,393,465 B2 | 5/2002 | Leeds |
| 6,421,709 B1 | 7/2002 | McCormick et al. |
| 6,453,327 B1 | 9/2002 | Nielsen |
| 6,484,197 B1 | 11/2002 | Donohue |
| 6,507,866 B1 | 1/2003 | Barchi |
| 6,732,157 B1 | 5/2004 | Gordon et al. |
| 6,769,016 B2 | 7/2004 | Rothwell et al. |
| 6,868,436 B1 | 3/2005 | Fleming, III |
| 6,996,606 B2 | 2/2006 | Hasegawa |

(Continued)

FOREIGN PATENT DOCUMENTS

| | | |
|---|---|---|
| EP | 0 720 333 A2 | 7/1996 |
| EP | 0 813 162 A2 | 12/1997 |
| GB | 2 347 053 A | 8/2000 |

OTHER PUBLICATIONS

"Methodology for Automatic Mail Processing", pp. 1-3, Publication Date: Jun. 21, 2003.

(Continued)

*Primary Examiner* — Andrew W Johns
*Assistant Examiner* — David F Dunphy
(74) *Attorney, Agent, or Firm* — Hoffman Warnick LLC; Douglas Lashmit

(57) ABSTRACT

A system and method for electronic document classification are provided. A method in accordance with an embodiment of the present invention includes: converting a candidate electronic document comprising character data to a candidate image; obtaining a representation of a degree of visual similarity of the candidate image to a reference image, the reference image having been obtained by identifying a reference electronic document containing character data representative of a specified classification; and converting the reference electronic document to a reference image.

18 Claims, 8 Drawing Sheets

U.S. PATENT DOCUMENTS

| | | |
|---|---|---|
| 7,016,939 B1 | 3/2006 | Rothwell et al. |
| 7,089,241 B1 | 8/2006 | Alspector et al. |
| 2002/0116641 A1 | 8/2002 | Mastrianni |
| 2003/0142886 A1* | 7/2003 | Ridge et al. .................... 382/299 |
| 2005/0050150 A1* | 3/2005 | Dinkin .......................... 709/207 |
| 2006/0150093 A1* | 7/2006 | Chen ............................. 715/518 |
| 2007/0208856 A1* | 9/2007 | Rounthwaite et al. ........ 709/225 |
| 2008/0082426 A1* | 4/2008 | Gokturk et al. ................. 705/27 |
| 2009/0043853 A1* | 2/2009 | Wei et al. ...................... 709/206 |
| 2010/0008579 A1* | 1/2010 | Smirnov ....................... 382/176 |

OTHER PUBLICATIONS

"The Method for Avoiding the Needless Mail", pp. 1-7, Publication Date: Jun. 30, 2006.

"Spam Bot Email Evader (SPEE)", pp. 1-4, Publication Date: Nov. 20, 2003.

* cited by examiner

Visual Filtering Engine – Administrative Console – Process user requests

| Summary |
|---|
| Process user requests |
| Modify system parameters |
| Import/export black list |
| Maintain black list |

| | From | Address | Subject | Date | Size |
|---|---|---|---|---|---|
| ☐ | Ames | tqmwoxdut@webstore2000.net | opening bowler Kyle Mills | 10/17/2006 | 35868 |
| ☑ | Medication ft. | efhuicktt@iplannetworks.net | all an abandoned | 10/20/2006 | 19514 |
| ☐ | easier manage | tcfqvaljxv@radiostation.com | on | 10/21/2006 | 18,636 |
| ☐ | Select | bxxjkvjvyyx@covad.net | Whats coverage Check out | 10/21/2006 | 4/13/1946 |
| ☑ | mode | esjyhhkmb@rosenbergassoc.com | pointed out before | 10/20/2006 | 20,988 |

[ Reject request ]  [ Accept request ]

FIG. 7

Visual Filtering Engine – Administrative Console – Modify system parameters

| Summary |
|---|
| Process user requests |
| Modify system parameters |
| Import/export black list |
| Maintain black list |

Mail server poll frequency    3 mins
Log file path    /user/home/soli/vfe.log
Black list entry count limit    300
Black list database name    MYTESTDB
Black list database type    IBM DB2 UDB ESE
Black list database port    50001

⋮

[ Save ]  [ Cancel ]

FIG. 8

```
Visual Filtering Engine - Administrative Console - Import/export black list

Summary
Process user requests          File format              .csv
Modify system parameters       File path                /user/home/soli/vfe-exp.csv
Import/export black list
Maintain black list                    [ Export ]        [ Import ]
```

FIG. 9

```
Visual Filtering Engine - Administrative Console - Maintain black list

Thumbnail   Content ID   Date added   Expiry date   Size
Summary
Process user requests           ☑ [▒▒]     093283      12/07/2006   12/07/2010    213
Modify system parameters
Import/export black list        ☐ [▒▒]     094256      13/12/2005   12/07/2008    122
Maintain black list
                                ☑ [▒▒]     113114      12/07/2003   12/07/2010    334

[ Delete ]   [ Change expiration date ]
```

FIG. 10

SYSTEM AND METHOD FOR ELECTRONIC DOCUMENT CLASSIFICATION

FIELD OF THE INVENTION

The present invention relates to the classification of electronic documents.

BACKGROUND OF THE INVENTION

An increasing proportion of communications, which have traditionally been carried out by means of paper documents, are now carried out by means of electronic documents. In many cases it is desirable to sort, classify, or group such documents. One example of a category of electronic documents that it is desirable to sort, classify, or group is that of unsolicited or "Junk" mail, which is an increasingly annoying problem that may consume a considerable amount of an e-mail recipient's time to process. It also consumes networking bandwidth, server storage, and processing power to deliver.

There are a number of partial prior art solutions to this problem, in particular in the context of unsolicited messages. All of these solutions are based on some sort of logic that correlates messages due to the values or the semantics of some of their fields. The following list includes a set of such solutions:

US 2002/0116641—Method and apparatus for providing automatic e-mail filtering based on message semantics, sender's e-mail ID and user's identity:
U.S. Pat. No. 7,089,241—Classifier tuning based on data similarities;
U.S. Pat. No. 6,996,606—Junk mail rejection system;
U.S. Pat. No. 6,868,436—Method and system for filtering unauthorized electronic mail messages;
U.S. Pat. No. 7,016,939—Intelligent spam detection system using statistical analysis;
U.S. Pat. No. 6,769,016—Intelligent spam detection system using an updatable neural analysis engine;
U.S. Pat. No. 6,732,157—Comprehensive anti-spam system, method and computer program product for filtering unwanted e-mail messages;
U.S. Pat. No. 6,507,866—e-mail usage pattern detection;
U.S. Pat. No. 6,484,197—Filtering incoming e-mail;
U.S. Pat. No. 6,453,327—Method and apparatus for identifying and discarding junk electronic mail;
U.S. Pat. No. 6,421,709—e-mail filter and method thereof;
U.S. Pat. No. 6,393,465—Junk electronic mail detector and eliminator;
U.S. Pat. No. 6,249,805—Method and system for filtering unauthorized electronic mail messages;
U.S. Pat. No. 6,199,103—Electronic mail determination method and system and storage medium;
U.S. Pat. No. 6,161,130—Technique which utilizes a probabilistic classifier to detect junk e-mail by automatically updating a training and retraining the classifier based on the updated training set;
U.S. Pat. No. 6,112,227—Filter-in method for reducing junk mail;
U.S. Pat. No. 6,023,723—Method and system for filtering unwanted junk e-mail utilizing a plurality of filtering mechanisms;
U.S. Pat. No. 5,999,932—System and method for filtering unsolicited electronic mail messages using data matching and heuristic processing;
U.S. Pat. No. 5,619,648—Message filtering techniques;
GB 02347053A—Proxy server filters unwanted emails;
EP 00813162A2—Method and apparatus for identifying and discarding junk electronic mail;
EP 00720333A2—Message filtering techniques;
IPCOM000016360D—Methodology for Automatic Mail processing;
IPCOM000020428D—Spam Bot Email Evader (SPEE);
IPCOM000137923D—The method for avoiding the needless mail; and
The Tumbleweed MailGate Product Suite—The processing of image content from a message, which determines to be unsolicited if it contains an image or is sent as an image that is similar to a previously identified image in a junk mail message.

More recent spamming techniques which are not satisfactorily handled by prior art techniques exhibit the following characteristics:

1. A massive number of email addresses used for sending spam mails;
2. Different domains used for sending spam mails;
3. Different sending server machines;
4. Different subject; and
5. Different textual content.

None of the above solutions are able to handle this style of spamming. Further, junk mail attacks are becoming more fierce with the introduction of specialized service providers that initiate different campaigns at the same time for different advertising clients, and consequently, different textual content all the time. Hence, there is a need for a complementary method that is textual content-independent, semantics-independent, and field-value-independent.

SUMMARY OF THE INVENTION

The present invention provides a method, computer program, computer readable medium, and system of classifying electronic documents. One advantage of the present invention lies in its ability to classify documents regardless of their image content.

Further advantages of the present invention will become clear to the skilled person upon examination of the drawings and detailed description. It is intended that any additional advantages be incorporated herein.

BRIEF DESCRIPTION OF THE DRAWINGS

Embodiments of the present invention will now be described by way of example with reference to the accompanying drawings in which like references denote similar elements.

FIG. 7 shows a second exemplary administrative interface to set parameters concerning process user requests.

FIG. 8 shows a third exemplary administrative interface to modify system parameters.

FIG. 9 shows a fourth exemplary administrative interface to import or export a black list.

FIG. 10 shows a fifth exemplary administrative interface to maintain or edit existing blacklists.

DETAILED DESCRIPTION OF THE INVENTION

Figure 1:
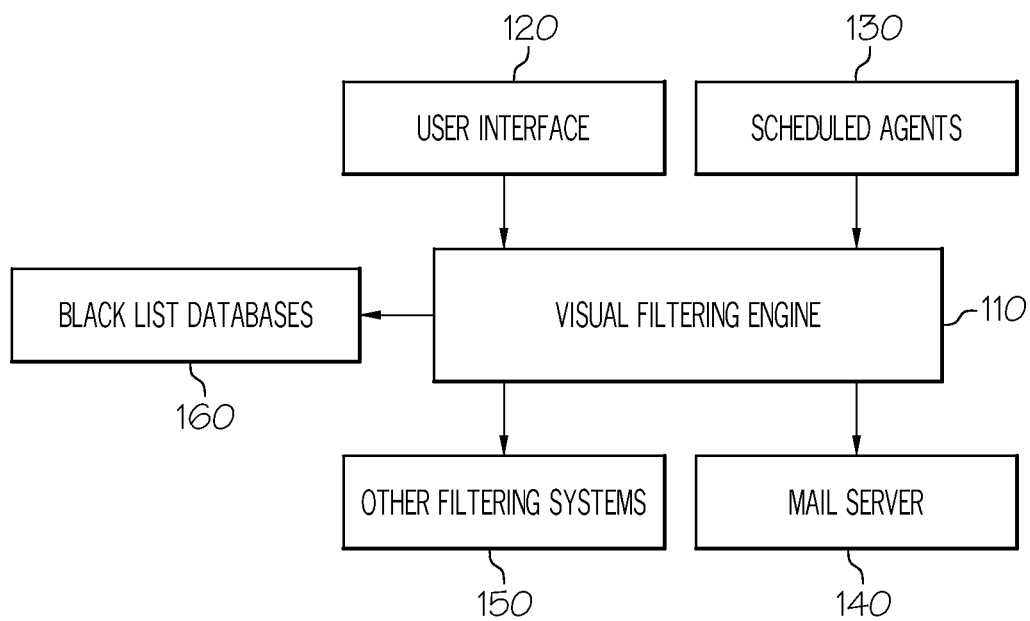
FIG. 1 shows a high-level block diagram of a system embodying the invention.

The present inventors have appreciated that electronic documents having common origins may tend overall to be visually similar. On this basis, there is provided a method of classifying electronic documents comprising: converting a candidate electronic document comprising character data to a candidate image; and obtaining a representation of a degree of visual similarity of the candidate image to a reference image, where the reference image is obtained by identifying a reference electronic document containing character data as representative of a specified classification, and converting the reference electronic document to a reference image. The document may comprise one or more images, which may be incorporated by reference or embedded in a single file. The document may be defined by means of a mark-up language such as HTML.

A number of methods for obtaining a representation of the degree of visual similarity between two digital image files will occur to the skilled person. For example, the step of obtaining a representation of the degree of visual similarity may comprise the steps of deriving shape or texture descriptors of the candidate image and comparing the shape or texture descriptors of the candidate image to respective shape or texture descriptors of the reference image. Similarly, the step of obtaining a representation of the degree of visual similarity may comprise the steps of deriving an edge histogram or wavelet transform of the candidate image and the step of comparing comprises comparing the edge histogram of the candidate image with an edge histogram or wavelet transform of the reference image.

Once the representation of the degree of visual similarity between the reference document and the candidate document has been determined, this information may be used in a number of ways. For instance, the representation may be presented to a user. The representation may be associated with the file for example in the form of metadata for future reference. Still further, in a case where the degree of visual similarity exceeds a predetermined threshold, classifying the candidate electronic document under the specified classification.

One example of a specified classification might be documents prepared by a particular individual, e.g., on the basis of a collection of documents considered to be representative of the favored layout style, etc., of selected individuals.

Another example of a specified classification might be unsolicited electronic messages, electronic junk mail or "spam". Junk mail campaigns are usually generated using HTML templates to support high volume submissions of different content. The present inventors have appreciated that this approach may lead to visual similarity in files from the same or a related template. It is accordingly proposed this fact may be used in filtering out junk mail messages based on visual similarities among those messages.

The present invention will now be described in the context of such an application.

FIG. 1 shows a high-level block diagram of the system embodying the invention. Block 110 is a visual filtering engine that realizes the conversion of candidate documents received via the mail server 140 into candidate images and the comparison of the candidate images with reference documents from black list databases 160. It can run as a standalone server or as a plug-in to a mail server. System parameters may include, for example, the frequency at which the mail server 140 is polled for new candidate documents (email messages). This mail server 140 may be any mail server such as an IMAP or POP3 server.

Element 150 represents other conventional filtering systems which may optionally be provided to function in serial or parallel with the classification system of the present invention. The term "conventional filter" used with respect to element 150 is used here to refer to mail filters that are based on the values of some fields of a message, such as senders address or subject, or the semantics of a message content as described above with reference to the prior art. The Mail Server 140 can be any commercial POP3 or IMAP mail server. The normal user interface 120 is the set of functions exposed to mail client users.

There is provided a black list storage module 160 which stores one or more reference documents, which in the context of the present embodiment are classified as being characteristic of unsolicited electronic messages. In the case of the present embodiment such reference documents will take the form of documents that have been identified as unsolicited electronic messages, or as being representative thereof. Accordingly the reference electronic document may be one of a plurality of reference electronic documents, each representative of the specified classification, each of which having been converted to a respective reference image. More specifically, the candidate electronic document and the reference electronic document are email messages and the specified classification corresponds to that of "unsolicited email messages".

Figure 2:
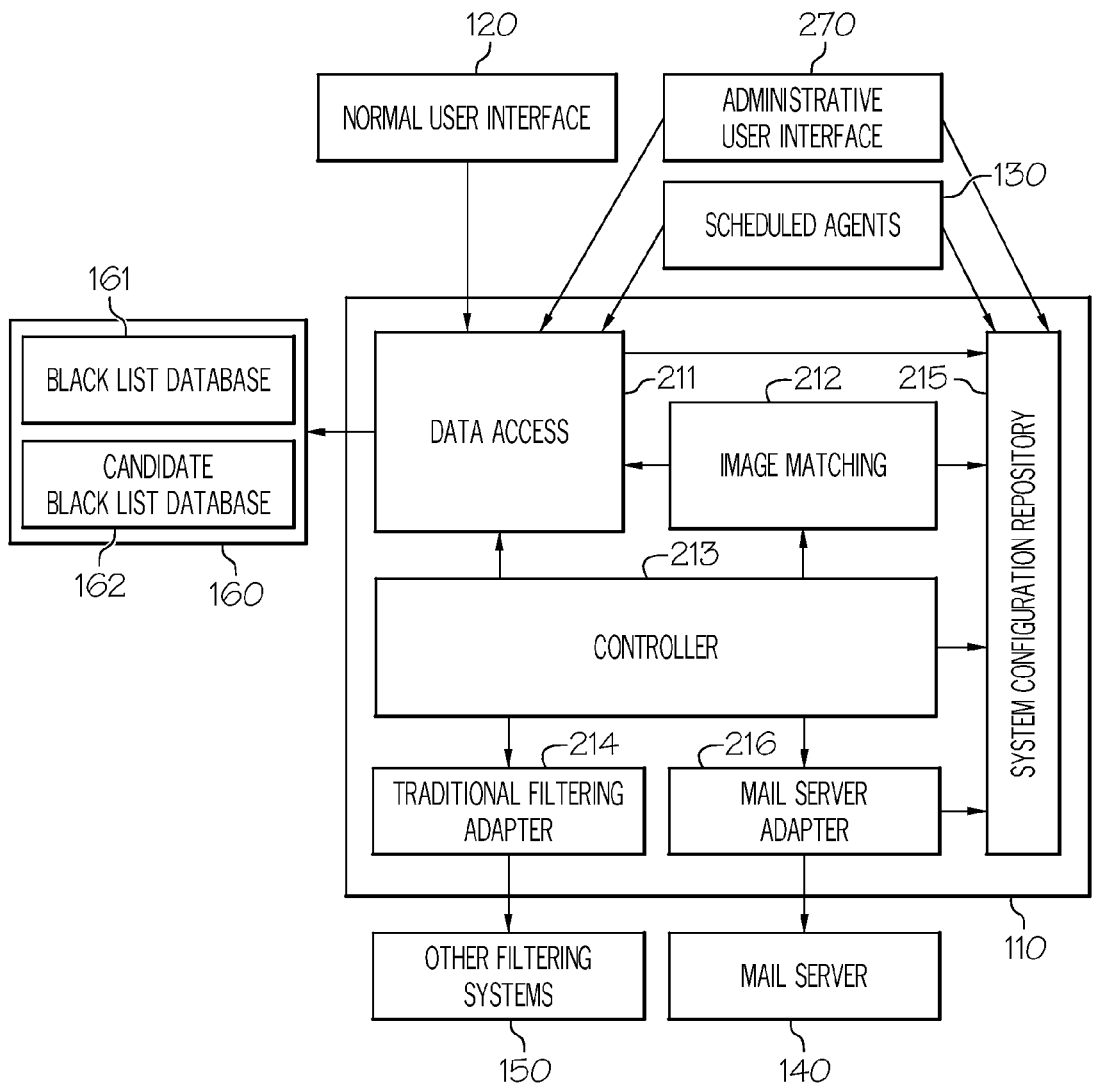
FIG. 2 shows a detailed block diagram that describes each component of the system outlined in FIG. 1, along with their inter-relations.

FIG. 2 describes the system of FIG. 1 in further detail. As shown, the visual filtering engine 110 comprises a controller 213 that is responsible for orchestrating the whole flow that realizes the method of the present invention. This resembles the brain of the system that utilizes the rest of the components. The controller 213 reads system parameters from the system configuration repository 215. System parameters may include, for example, the frequency at which the mail server 140 is polled for new messages. The controller 213 uses data access module 211 to manipulate black listed content.

A data access module 211 is responsible for maintain black listed content databases. The purpose of having the data access module 211 is to give the extensibility to the persistence used, that is being able to use different database management system products or even file-based persistence, without having to make any changes to the engine. The data access module 211 is intended to be a pluggable component that adapts to an underlying persistence implementation. The data access module gives access to black list storage module 260 which contains black list database 261 and candidate black list database 262. The black list database 261 keeps record of content that is considered junk. This content is simply the binary content captures of previously identified junk mail whereas 262 is a temporary database that keeps a copy of the actual messages marked as junk by a mail user. The data access module 211 reads system parameters from the system configuration repository 215. System parameters are such as the maximum amount of content to be stored before storage space is recycled, the duration of validity of stored content and the database parameters (data source name, driver and port).

The image matching module 212 is invoked to check the content of a suspected mail against the black list database 261. In order to do this, the image matching module 212 converts the HTML body of the e-mail message into an image, then compares that image to black listed content using specialized software that is not part of the engine itself.

Hence, the image matching module 212 acts as an adapter that can use different image matching packages.

In order to access the black list database 261, the image matching module 212 uses the data access module 211. The image matching module 212 reads system parameters from the system configuration repository 215. System parameters are such as the matching level of tolerance, preferred image file format, the location of log files to be generated and the name of the image matching software package to be used.

The traditional filtering adapter 214 is an adapter that the controller 213 uses to invoke other traditional filters 150 that may exist. The term "traditional filter" is used here to refer to mail filters that are based on the values of some fields of a message, such as senders address or subject, or the semantics of message content. A comprehensive list of such filters is included under the "Background" section. The other filtering systems 150 are not a part of the system. However, they may be associated with the system so as to offer further enhanced performance. The traditional filtering adapter 214 is also responsible for feeding back the message information of the junk mail messages identified by the system to update the block list of these filters, e.g., the address of the sender.

The block 216 represents the mail server adapter which is used to poll the mail server 140 for new messages, to mark junk mail, to move such a mail from in-box to the junk mail folder, and to retrieve its content for processing. The mail server adapter 216 reads system parameters from the system configuration repository 215. System parameters are such as the IP of the mail server to connect to, its type and port number.

The mail server 140 is not a part of the system. The mail server 140 can be any commercial POP3 or IMAP mail server. The normal user interface 120 is the set of functions exposed to mail client users.

Figure 3:
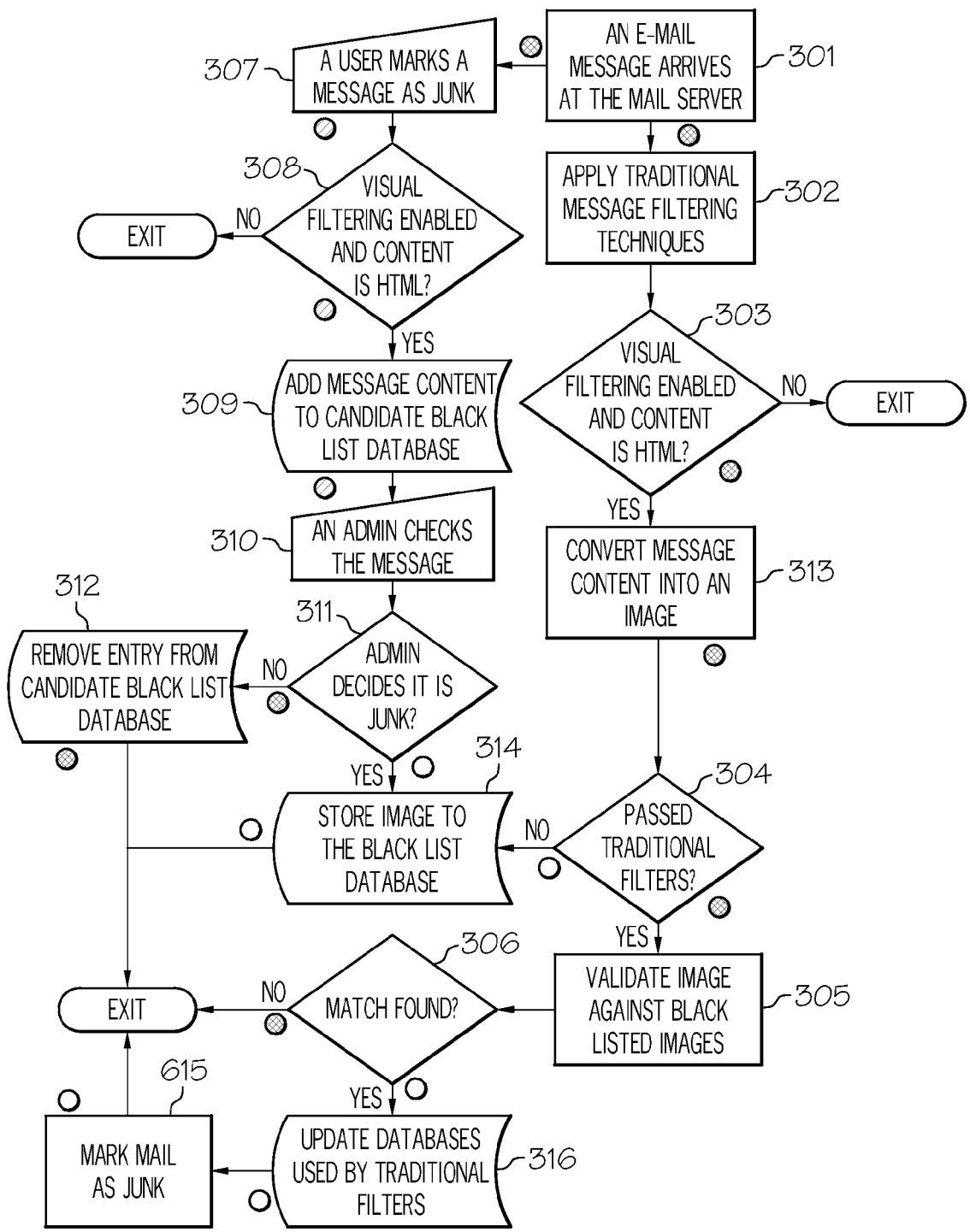
FIG. 3 shows a flowchart that demonstrates an implementation of a first embodiment.

FIG. 3 shows a flowchart that demonstrates an implementation of a first embodiment. In FIG. 3, steps belonging to a flow according to which a candidate document is classified as an unsolicited message by the process of the present invention or by intervention of an administrator are indicated by a white spot. Steps belonging to a flow according to which a candidate document is classified as an unsolicited message by intervention of the user are indicated by a hashed spot. Steps belonging to a flow according to which a candidate document is classified as an unsolicited message by intervention of the user are indicated by a black spot.

FIG. 3 shows how the flow starts when at step 301 a message arrives at the mail server 140, that is, when the mail server adapter 216 notifies the controller 213. At block 302, the controller 213 invokes other filtering systems 150 using traditional filtering adapter 214 which should apply traditional filtering techniques, like those mentioned here in the related prior art, to the newly arrived message. During step 302, if the message is identified as junk, it is marked accordingly for further processing according to the present invention.

At step 303, if the visual filtering is not enabled or the content type of the message is not HTML, the system exits with no action. Otherwise, at step 313 the controller 213 invokes image matching module 112 to generate an image out of the body section of the message. At step 304, the result from step 302 is examined, if the message has been identified as junk by traditional filters in step 302, the image created during step 313 is stored to the black list database 261. This takes place at step 314, before the system exits. Otherwise, if the result of the check step 304 shows that the message has not been identified as junk during step 302 by traditional filters 150, step 305 is executed when the controller 213 uses image matching module 212 to compare the image generated during step 313 against black listed content stored in black list database 261. Thus a representation of the degree of visual similarity of each of the respective reference images to the candidate image is obtained. The result of step 305 is examined at step 30. If a match is not found in the black list database 261, the system exits. Otherwise, if a match is found, the mail is identified as junk by the system. Thus, in a case where the degree of visual similarity exceeds a predetermined threshold with respect to any one of the respective reference image, the candidate electronic document is classified under the specified classification.

Step 316 is executed to let the controller 213 use traditional filtering adapter 150 to update the records of other filtering systems 150 with the information of the junk mail message, so that any content from the same sender is blocked in the future by traditional filters at the earlier stage step 302. Step 315 is executed when the controller 213 marks the message as junk and moves it to the junk mail folder of its original recipient before the system exits.

Figure 5:
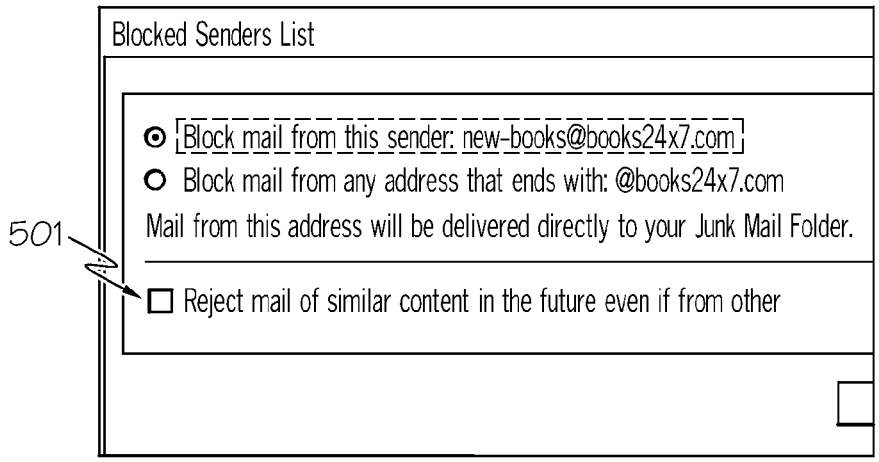
FIG. 5 shows an exemplary normal user interface screen.

The other branch of the flow starts at step 307 when a user opens the in-box and marks a message as junk, as shown in FIG. 5. At step 308, if the visual filtering is not enabled or the content type of the message is not HTML, the system exits with no action. Otherwise, the message is added to the candidate black list database 262 during step 309 pending administrator approval. At step 310, an administrator uses the administration console 270, for example by means of an interface described in more detail hereafter, to decide whether that message is considered junk, in general or it is just that user who consider it junk. At step 311, the result of this decision controls the flow; if the administrator approves it as junk, step 314 is executed and the image is added to the black list database 261. Otherwise, the entry is removed from the candidate black list database 262 during step 312 before the system exits.

Figure 4:
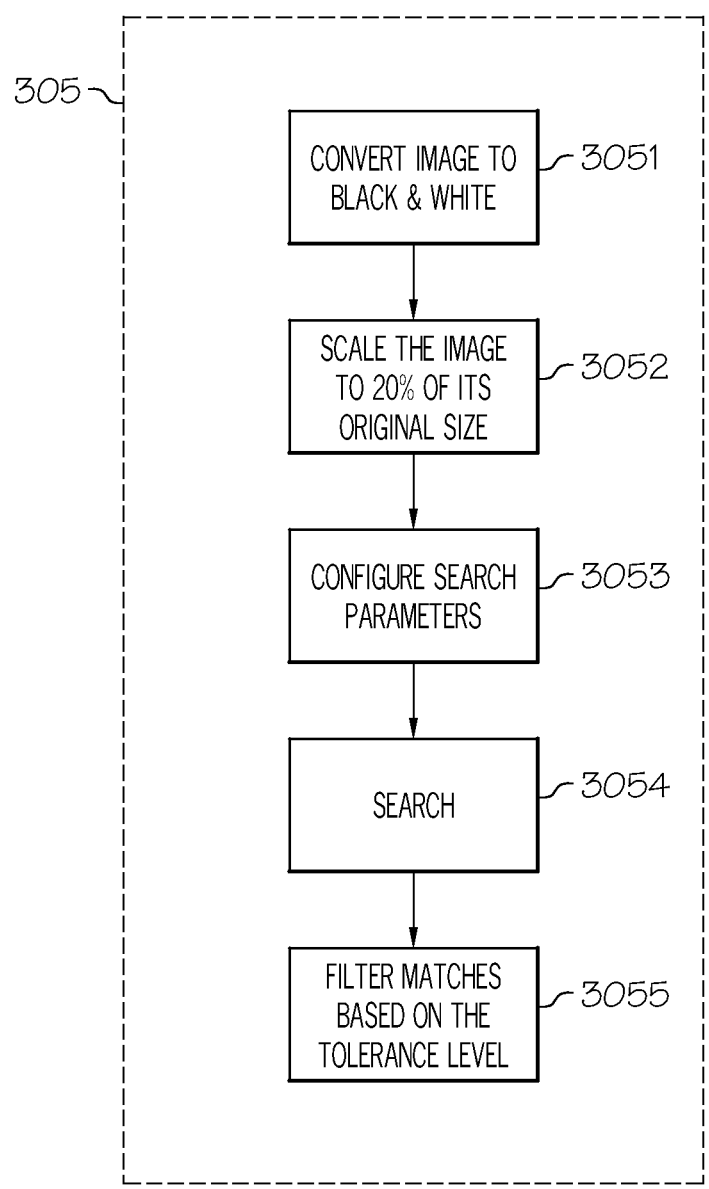
FIG. 4 shows the logical flow of the code snippets provided in an embodiment.

FIG. 4 shows substeps of step 305. A number of techniques may be envisaged for optimizing the accuracy with which documents may be classified according to the present invention. As shown in FIG. 4, the solution expands block step 305 into five steps. These steps are as follows:

Step 3051

In step 3051, the image is converted to black and white to neutralize the effect of colors on the matching process. That is, the further step of reducing the color depth of the candidate image to a grayscale image is provided. The color depth may alternatively be limited to a predefined limited color palette. A sample Java™ source code that provides this conversion is shown below:

```
    private BufferedImage
convertBufferedImageToGrayScale(BufferedImage_source) {
        byte[ ] comp = { 0, -1 };
        final IndexColorModel cm =
new IndexColorModel(2, 2, comp, comp, comp);
        final BufferedImage result =
            new BufferedImage(_source.getWidth( ),
            _source.getHeight( ),
BufferedImage.TYPE_BYTE_INDEXED, cm);
        final Graphics2D g = result.createGraphics( );
        g.drawRenderedImage(_source, null);
        g.dispose( );
        return result;
    }
```

Step 3052

In step 3052, the image is scaled to 20% of its original size. This step provides two advantages: reduces the time consumed to compare images and reduces the amount of details (when an image is scaled down it loses some of its details). Losing these details is positive in the present invention, because it makes the comparison focus more on the overall look of the content rather than the details. The image may of course be scaled by any suitable factor. Alternatively, the level of detail present in the image may be reduced by other means such as for example imposing a Gaussian blur filter or the like. In other words there is provided a further step of reducing the resolution of the candidate image to a point where the character data becomes illegible. A sample Java™ source code that does this scaling is shown below:

```
    private BufferedImage getScaledImage(
            final BufferedImage _buffered_image_read,
            final int _target_width,
            final int _target_height) throws IOException {
        final BufferedImage bufferedImageWritten =
                new BufferedImage(_target_width,
                _target_height,
BufferedImage.TYPE_INT_RGB);
        bufferedImageWritten.createGraphics( ).drawImage(
                _buffered_image_read.getScaledInstance(_target_width,
                _target_height, Image.SCALE_DEFAULT),
0, 0, null);
        return bufferedImageWritten;
    }
```

Step 3053

In step 3053, LIRE search configurations are done so as to use only the texture weight (the MPEG-7 edge histogram descriptor). The image of the new mail message is also passed as a search parameter ("sampleBufferedImage" in the code). A sample Java™ source code that implements this configuration is shown below.

```
        // Creating an ImageSearcher
        ImageSearcher searcher =
                ImageSearcherFactory.createWeightedSearcher(
                100, 0.0f /* colorHistogramWeight */,
                0.0f /* colorDistributionWeight */, 1.0f /* textureWeight
*/);
        // Search for similar images
        ImageSearchHits hits = null;
        hits = searcher.search(sampleBufferedImage, lireIndexReader);
        //Get a document from the results
        Document document = hits.doc(0);
        // Search for similar Documents based on the image features
        hits = searcher.search(document, lireIndexReader);
```

Step 3054

In step 3054, the actual search is done and search hits are returned, as indicated by the last line of the previous code snippet.

Step 3055

In step 3055, the hits are scanned for search hits that are close enough to the image of the new message that is provided. "Close enough" is determined by a threshold tolerance factor that can be set by an administrator (hard coded here in the code). A sample Java™ source code that does this filtering is shown below:

```
        //Hits are considered "close enough", if they score relevance above
        // 50%.
        float matchToleranceThreshold = 0.5f;
        //A flag the determines whether a hit is close enough to be considered
        // a match
        boolean isMatchCloseEnough = false;
        //Scan search hits for matches that are close enough
        for (int i = 0; i < hits.length( )
                && !(isMatchCloseEnough = (hits.score(i) >
matchToleranceThreshold)); i++)
            ;
```

It will be appreciate that some or all of steps 3051 to 3055 may be omitted, and that the order of the steps may be changed, and that other step may be added. For example, steps 3051 and 3052 may be interchanged, or one or the other removed or replaced.

FIG. 5 shows a proposed implementation of the functions of the normal user interface 120. FIG. 5 is a typical screen shot from IBM® Lotus Notes® client, with the new option 501 added. Option 501 allows a mail client user to trigger the system to process a message as junk and use it to update the black list database 261. The selection of the option 501 captures message information to the candidate black list database 262 for administrative user action. For FIG. 5, Lotus Notes is just used for by way of example. The skilled person will appreciate that this embodiment of the invention could be implemented in any other mail client, including web-based clients.

Block 270 is the administrative user interface where an administrator can perform tasks, such as deciding whether to process requests submitted by normal users, through the normal user interface 120, to black list certain mail content. The administrative user interface 270 utilizes data access module 211 to manipulate black listed content. Administrators also can modify system configuration parameters using the system configuration repository 215. All system configuration parameters that are used for all other modules can be updated from the administrative user interface 270. Using the administrative user interface 270, administrators can export and import black listed content to and from other similar systems. Another function that can be carried out using the administrative user interface 270 is the maintenance of black listed content. The administrative user interface 270 can be implemented as a web-based interface that utilizes APIs that are exposed by data access module 211 and system configuration repository 215. Alternatively, the administrative user interface 270 can be integrated with the administrative client of the 140 mail server.

The scheduled agents module 130 is an automated alternative to the interactive administration provided by the administrative user interface 270. Such administrative agents can be scheduled to perform tasks to control the system and black list replications. The scheduled agents module 130 uses the same APIs used by the administrative user interface 270. One purpose of the scheduled agents module 130 is to provide automated export/import mechanism to share black listed content with other similar systems. A secondary benefit of the scheduled agents module 130 is the ability to run housekeeping mechanisms that maintain black listed content. Like the administrative user interface 270, the scheduled agents module 130 uses APIs that are exposed by the data access module 211 and the system configuration repository module 215. The scheduled agents module 130 can be either implemented as operating system shell scripts or run as a part of a scripting environment that runs within the system.

The system configuration repository module 215 is where system parameters that control the system are stored. System parameters were mentioned earlier as a part of other modules description. This module can use a simple properties file as a repository for example.

A proposed design of the administrative user interface 270 is described in more detail hereafter with reference to FIGS. 6 to 10.

Figure 6:
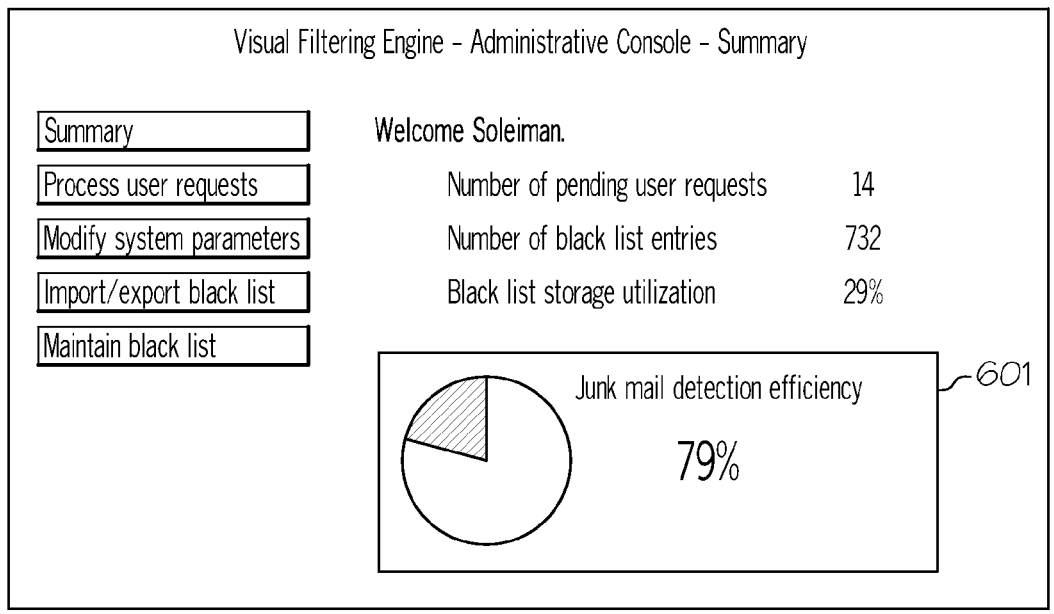
FIG. 6 shows a first exemplary administrative interface showing a summary of status information.

FIG. 6 shows a first exemplary administrative user interface 270 showing a summary of status information. As shown, the administrative user interface 270 provides statistics concerning the classification status of the system, in particular with the member of pending user requests, the number of black list entries, the percentage black list storage utilization and the junk mail detection efficiency percentage 601. Conventional user interface mechanisms such as tabs or buttons are provided allowing access to further interface screens for the user to access more detailed information and to set parameters concerning process user requests as described below with reference to FIG. 7, to modify system parameters as described below with reference to FIG. 8, to import or export a black list as described below with reference to FIG. 9, and to maintain or edit existing blacklists as described below with reference to FIG. 10.

The item 601 "Junk mail detection efficiency" is a percentage that is calculated as follows:

$$\text{Junk Mail Detection Efficiency (JMDE)} = A*100/(A+M)$$

where:
A: the number of automatically detected junk mail
M: the number of user detected junk mail FIG. 7 shows a second exemplary administrative user interface 270 to set parameters concerning process user requests. As shown in Figure, in this interface screen there is presented a list of recently received messages, listing for each message the originator, the originating address, the subject, date, size, etc. For each message there is provided a checkbox or similar interface mechanism enabling the user to individually select or deselect one or more message from the list. There are further provided buttons or similar interface mechanisms allowing the user to accept the selected messages, that is, to force the system to treat these messaged as classified as desired messaged, or to reject the selected requests, that is, to force the system to treat these messaged as classified as undesired messages.

FIG. 8 shows a third exemplary administrative user interface 270 to modify system parameters. As shown in FIG. 8, in this interface screen there is presented a variety of system parameters which may be modified to ensure correct functioning of the system. As shown, the user may set the mail server poll frequency, the file path of the log file, the maximum number of black list entries, the identity of the black list database 261, the characteristics of the black list database 261 (here IBM DB2® UDB ESE) and the part of the black list database 261. Naturally any number of other relevant characteristics may be addressed. There are further provided buttons or similar interface mechanisms allowing the user to save or cancel changes made to the parameters accessible through this interface.

FIG. 9 shows a fourth exemplary administrative user interface 270 to import or export a black list. As shown in FIG. 9, in this interface screen there is presented text indicating a black list file format (here the comma separated variable (CSV) format, and the file path of a black list file in this format. There are further provided buttons or similar interface mechanisms allowing the user to import the selected file to the system, or to export the selected file for use in another system. The facility to export or import blacklists (or in the context of other embodiments, reference documents or images, or collections, lists or databases of these), makes it possible to envisage service models whereby a user may be provided with a blacklist representing the must current unsolicited message types (or other document classification) by a commercial supplier. Such provision may of course be automatic, for example by means of an automatic download over the internet. This facility may also assist a user in maintaining a common, current black list across a number of systems, e.g., at home and at work, or amongst the various users of a net work, and so on.

FIG. 10 shows a fifth exemplary administrative user interface 270 to maintain or edit existing blacklists. As shown in FIG. 10, in this interface screen there is presented a list of reference images recently added to the blacklist image database, listing for each a thumbnail of the image, the content ID, the date added to the blacklist, the expiry date and size etc. For each message there is provided a checkbox or similar interface mechanism enabling the user to individually select or deselect one or more reference image from the list. There are further provided buttons or similar interface mechanisms allowing the user to delete the selected reference images from the black list, or to change the expiration date for the selected reference images.

According to certain embodiments parts of the system can be implemented using commercially available components, open source or custom developed components. The following table suggests a number of possible approaches to implementation. (COTS stands for "Commercial off-the-shelf" product).

| reference | Component Name | Realisation | Technology or standard | Product |
| --- | --- | --- | --- | --- |
| 213 | Controller | Business process module | BPEL or J2EE | WebSphere ® Process server |
| 211 | Data Access | Library | Java ™ and/or Hibernate | |
| 212 | Image Matching | Executable or library | Invoked via command line or exposed API | -image comparer<br>Lucene Image retrieval (Lire) and Caliph & Emir (for image matching)<br>IBM DB2 AIV extenders<br>PDFCreator (for printing mail as image |
| 214 | Traditional Filtering adapter | Library | Java ™ | |

-continued

| reference | Component Name | Realisation | Technology or standard | Product |
|---|---|---|---|---|
| 216 | Mail server adapter | Library | Java ™ | |
| 150 | Other filtering systems | Executable or library | Mail server plugins or standalone programs | |
| 140 | Mail Server | | POP3 or IMAP | Lotus Domino Server |
| 215 | System configuration repository | Library | Java ™ | |
| 161 | Black list database | Database | SQL | DB2 UDB |
| 162 | Candidate black list database | Database | SQL | DB2 UDB |
| 120 | Normal user interface | | | Lotus notes or Lotus workplace |
| 270 | Administrative user interface | | | Lotus workplace |
| 130 | Scheduled agents | Shell scripts | Batch files, c shell, ANT | |

According to certain embodiments, the step of obtaining a representation of the degree of visual similarity comprises the steps deriving shape or texture descriptors of the candidate image and comparing the shape or texture descriptors of the candidate image to respective shape or texture descriptors of the reference image. More particularly, the step of obtaining a representation of the degree of visual similarity may comprise the steps deriving shape or texture descriptors of the candidate image comprises deriving an edge histogram of the candidate image and the step of comparing comprises comparing the edge histogram of the candidate image with an edge histogram of the reference image.

The following three sections discuss three different options based on the product or component used to realize the image comparison part (component 504 of the system and block step 305 of the method). With all options, PDFCreator (available from http://sourceforge.net/projects/pdfcreator/) can be used for example to produce the image of a message. Alternatively, the command line version of PDFCreator can be used, instead of using its GUI.

An example of a suitable commercial application for the comparison of the reference candidate image with the reference image is ImageComparer available from Bolidesoft.com.

For actual system implementation as described above, the command line version of ImageComparer can be used. Also, the threshold that determines how do the system considers two images similar is a system parameter that can be configured in the system configuration repository 215.

Although this option gives excellent matching results, both the matching method and its implementation are proprietary. This gives limited opportunity for extension that might be required to enhance matching or to satisfy implementation quality of service attributes.

Since the method depends on visual similarities rather than message semantics, Content-Based Image Retrieval (CBIR) suits this purpose very well. A CBIR system that performs querying by example and retrieves results with relevance can be used to compare the image equivalent of a candidate image with previously indexed reference images. That is to query that CBIR system for images that are similar to the one at hand (the image equivalent of a new message). If the relevance of matching images falls within the tolerance limit set for example by an administrator, the candidate can be handled accordingly.

The MPEG-7 standard provides methods that allows ISVs to implement CBIR. The most relevant features of MPEG-7 are texture descriptors and shape descriptors. These two sets of descriptors focus on extracting features of an image that are independent of the colors (which can be typically varying when dealing with junk mail). Selective combinations of these descriptors can be jointly used to reach more precise results. However, for prototyping purposes, an open source library "Lucene Image REtrieval (LIRE)" that implements Edge Histogram (one of the texture descriptors defined by MPEG-7) was used. LIRE also implements other descriptors that deals with colors, but these are considered irrelevant to the matching scheme described here.

An advantage of this option is the fact that it is based on an open standard (MPEG-7) and an open source implementation (LIRE) which allows for further extension and enhancements.

IBM has its own implementation of CBIR named Query By Image Content—QBIC® which is shipped as a part of IBM DB2 Image Extender (one of IBM DB2 AIV Extenders). Using QBIC, images of black listed messages are stored on DB2 UDB as BLOBs and are queried using DB2 Image Extender. QBIC provides searches by sample images (the image of the new message, in our case).

According to a further embodiment there is provided a method of classifying electronic documents such as unsolicited electronic messages (junk mail or "spam") converting a complete candidate electronic document comprising character data (and possibly also image data) to a candidate image and comparing the candidate image with a reference image obtained by converting a reference electronic document considered to be representative of the classification in question, and in a case where the candidate image is sufficiently similar to the reference image, classifying the candidate document accordingly. Improved performance may be obtained by reducing the size of the candidate and reference images, and/or by reducing the images to a grayscale.

While the present invention has been described in terms of a system for identifying unsolicited email messages, it will be appreciate that the inventive concept may be applied equally to a wide range of electronic document classification tasks.

The invention can take the form of an entirely hardware embodiment, an entirely software embodiment or an embodiment containing both hardware and software elements. In an embodiment, the invention is implemented in software, which includes but is not limited to firmware, resident software, microcode, etc. In particular it will be appreciated that the functionality of many of the components of FIGS. 1 and 2 may be implemented by means of software, hardware or firmware of any combination of these. In a high performance system a hardware implementation of the edge histogram function may prove advantageous for example.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Figure 11:
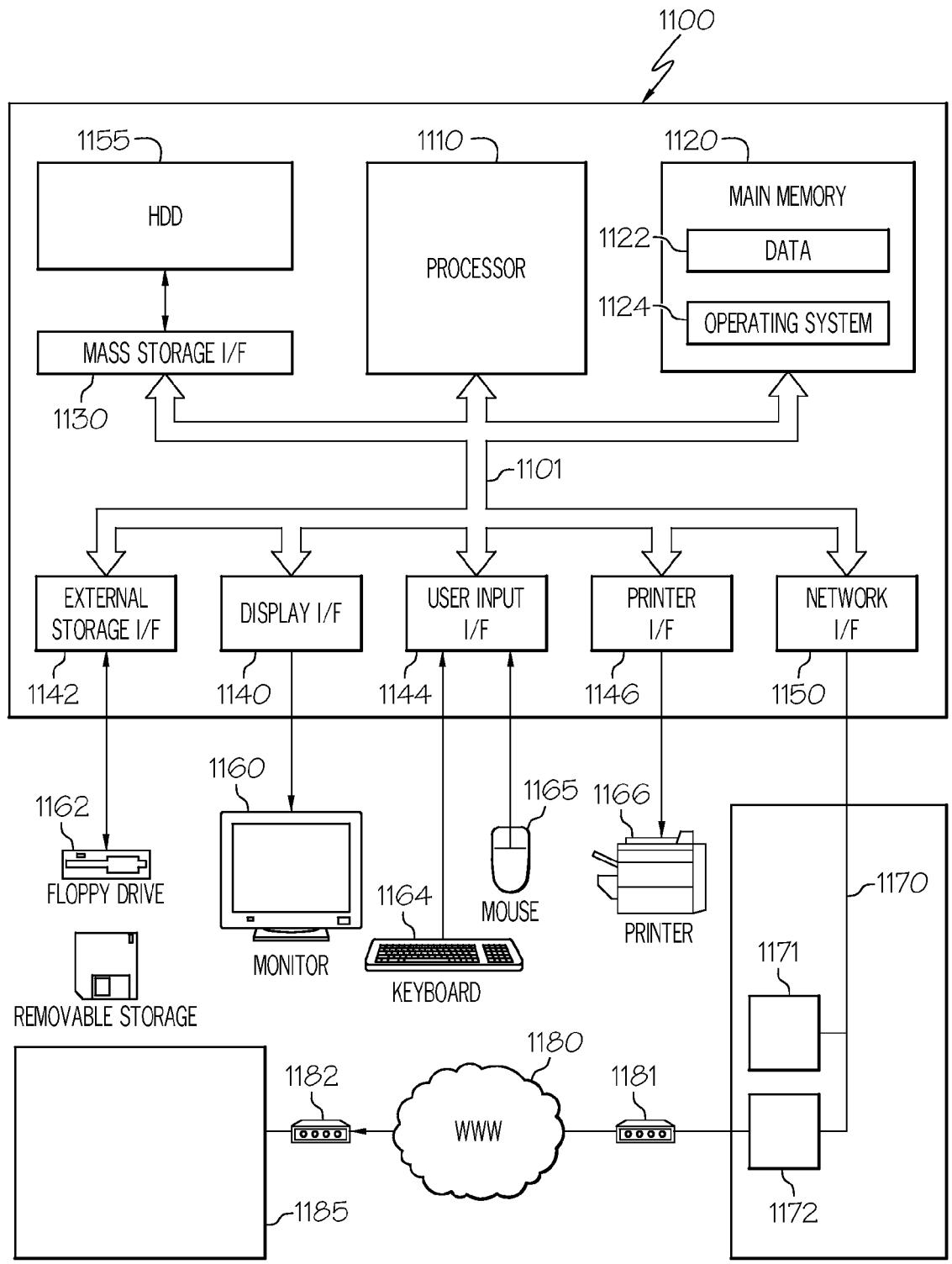
FIG. 11 shows a computer system suitable for implementation of embodiments of the present invention.

FIG. 11 shows a computer system suitable for implementation of embodiments of the present invention. Computer system 1100 comprises a processor 1110, a main memory 1120, a mass storage interface 1130, a display interface 1140, and a network interface 1150. These system components are interconnected through the use of a system bus 1101. Mass storage interface 1130 is used to connect mass storage devices (Hard disk drive 1155) to computer system 1100. One specific type of removable storage interface drive 1162 is a floppy disk drive which may store data to and read data from a Floppy disk 1195, but may other types of computer readable storage medium may be envisaged, such as readable and optionally writable CD ROM drive. There is similarly provided a user input interface 244 which received user interactions from interface devices such as a mouse 265 and a keyboard 264. There is still further provided a printer interface 246 which may send and optionally receive signals to and from a printer 266. Main memory 1120 in accordance with embodiments contains data 1122, and an operating system 1124.

Computer system 1100 utilizes well known virtual addressing mechanisms that allow the programs of computer system 1100 to behave as if they only have access to a large, single storage entity instead of access to multiple, smaller storage entities such as main memory 110 and HDD 1155. Therefore, while data 1122, operating system 1124, are shown to reside in main memory 1120, those skilled in the art will recognize that these items are not necessarily all completely contained in main memory 1120 at the same time. It should also be noted that the term "memory" is used herein to generically refer to the entire virtual memory of computer system 1100. Candidate documents and/or images may be stored in any part of the virtual memory.

Data 1122 represents any data that serves as input to or output from any program in computer system 1100. Operating system 1124 is a multitasking operating system known in the industry as OS/400; however, those skilled in the art will appreciate that the spirit and scope of the present invention is not limited to any one operating system.

Processor 1110 may be constructed from one or more microprocessors and/or integrated circuits. Processor 1110 executes program instructions stored in main memory 1120. Main memory 1120 stores programs and data that processor 1110 may access. When computer system 1100 starts up, processor 1110 initially executes the program instructions that make up operating system 1124. Operating system 1124 is a sophisticated program that manages the resources of computer system 1100. Some of these resources are processor 1110, main memory 1120, mass storage interface 1130, display interface 1140, network interface 1150, and system bus 1101.

Although computer system 1100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 1110. However, those skilled in the art will appreciate that the present invention applies equally to computer systems that simply use I/O adapters to perform similar functions.

Display interface 1140 is used to directly connect one or more displays 1160 to computer system 1100. These displays 1160, which may be non-intelligent (i.e., dumb) terminals or fully programmable workstations, are used to allow system administrators and users to communicate with computer system 1100. Note, however, that while display interface 1140 is provided to support communication with one or more displays 1160, computer system 1100 does not necessarily require a display 1165, because all needed interaction with users and other processes may occur via network interface 1150.

Network interface 1150 is used to connect other computer systems and/or workstations (e.g., 1175 in FIG. 11) to computer system 1100 across a network 1170. The present invention applies equally no matter how computer system 1100 may be connected to other computer systems and/or workstations, regardless of whether the network connection 1170 is made using present-day analogue and/or digital techniques or via some networking mechanism of the future. In addition, many different network protocols can be used to implement a network. These protocols are specialized computer programs that allow computers to communicate across network 1170. TCP/IP (Transmission Control Protocol/Internet Protocol) is an example of a suitable network protocol., for example over an Ethernet network. As shown, the network 1170 connects the system 1100 to two further devices 1171 and 1172, which may be other computer systems similar to that described above, or other network capable devices such as printers, routers etc. In the present example, network device 1172 is an lcl server, which is connected via a modem 1181 to a public network 1180 such as the word wide web. By means of this public network 1180 a connection to a remote device or system 1185 may be established.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

IBM and DB2 are registered trademarks of International Business Machines Corporation in the United States, other countries, or both. Adobe, the Adobe logo, PostScript, and the PostScript logo are either registered trademarks or trademarks of Adobe Systems Incorporated in the United States, and/or other countries. Java and all Java-based trademarks are trademarks of Sun Microsystems, Inc. in the United States, other countries, or both. Other company, product or service names may be trademarks or service marks of others.

The invention claimed is:

1. A method of classifying electronic documents, comprising:
converting a hypertext markup language (HTML) candidate electronic document comprising character data to a single candidate image, the converting including extracting a body section of the HTML candidate electronic document and converting the entire body section of the HTML candidate electronic document into the single candidate image;
scaling the entire single candidate image to a size substantially smaller than an original size of the candidate image to provide a single scaled candidate image;
obtaining a representation of a degree of visual similarity of the entire single scaled candidate image to a reference image by performing a single comparison of the entire single scaled candidate image to the entire reference image, the reference image having been obtained by identifying a reference electronic document containing character data representative of a specified classification;
automatically classifying the candidate electronic document under the specified classification when the degree of visual similarity exceeds a predetermined threshold and, in response to the degree of visual similarity exceeding the predetermined threshold, converting the reference electronic document to a reference image; and
determining an efficiency of the classifying by comparing a number of candidate electronic documents that are automatically classified under the specified classification to a number of candidate electronic documents that a user classifies under the specified classification.

2. The method of claim 1, further comprising:
presenting information regarding the reference image to a user, wherein the reference image is stored in a black list database, the presenting including generating a graphical user interface, the graphical user interface displaying a thumbnail image of the reference image, an identifier of the reference image, a date that the reference image was added to the black list database, and an expiration date of the reference image, the graphical user interface further including components for allowing the user to selectively perform at least one of: deleting the reference image and changing the expiration date of the reference image.

3. The method of claim 1, wherein the reference electronic document is one of a plurality of reference electronic documents, each representative of the specified classification, each of which having been converted to a respective reference image; and wherein a representation of the degree of visual similarity of each of the respective reference images to the entire scaled candidate image is obtained; and in a case where the degree of visual similarity exceeds a predetermined threshold with respect to any one of the respective reference images, classifying the candidate electronic document under the specified classification.

4. The method of claim 1, wherein the candidate electronic document and the reference electronic document are email messages and wherein the specified classification corresponds to unsolicited email messages.

5. The method of claim 1, further comprising:
reducing a resolution of the candidate image to a point where the character data becomes illegible.

6. The method of claim 1, further comprising:
reducing a color depth of the candidate image to a grayscale image.

7. The method of claim 1, wherein obtaining a representation of the degree of visual similarity further comprises:
deriving shape or texture descriptors of the entire scaled candidate image and comparing the shape or texture descriptors of the entire scaled candidate image to respective shape or texture descriptors of the reference image.

8. The method of claim 7, wherein deriving shape or texture descriptors of the entire scaled candidate image further comprises:
deriving an edge histogram of the entire scaled candidate image, and wherein the comparing further comprises comparing the edge histogram of the entire scaled candidate image with an edge histogram of the reference image.

9. A computer program product loaded on a non-transitory computer readable medium, which when executed, classifies electronic documents, comprising program code for:
converting a hypertext markup language (HTML) candidate electronic document comprising character data to a single candidate image, the converting including extracting a body section of the HTML candidate electronic document and converting the entire body section of the HTML candidate electronic document into the single candidate image;
scaling the entire single candidate image to a size substantially smaller than an original size of the candidate image to provide a single scaled candidate image;
obtaining a representation of a degree of visual similarity of the single entire scaled candidate image to a reference image by performing a single comparison of the entire single scaled candidate image to the entire reference image, the reference image having been obtained by identifying a reference electronic document containing character data representative of a specified classification;
automatically classifying the candidate electronic document under the specified classification when the degree of visual similarity exceeds a predetermined threshold and, in response to the degree of visual similarity exceeding the predetermined threshold, converting the reference electronic document to a reference image; and
determining an efficiency of the classifying by comparing a number of candidate electronic documents that are automatically classified under the specified classification to a number of candidate electronic documents that a user classifies under the specified classification.

10. The computer program product of claim 9, further comprising program code for:
presenting information regarding the reference image to a user, wherein the reference image is stored in a black list database, the presenting including generating a graphical user interface, the graphical user interface displaying a thumbnail image of the reference image, an identifier of the reference image, a date that the reference image was added to the black list database, and an expiration date of the reference image, the graphical user interface further including components for allowing the user to selectively perform at least one of: deleting the reference image and changing the expiration date of the reference image.

11. A computer-implemented method for classifying electronic documents comprising:
   converting a hypertext markup language (HTML) candidate electronic document comprising character data to a single candidate image, the converting including extracting a body section of the HTML candidate electronic document and converting the entire body section of the HTML candidate electronic document into the single candidate image;
   scaling the entire single candidate image to a size substantially smaller than an original size of the candidate image to provide a single scaled candidate image;
   obtaining a representation of a degree of visual similarity of the single entire scaled candidate image to a reference image by performing a single comparison of the entire single scaled candidate image to the entire reference image, the reference image having been obtained by identifying a reference electronic document containing character data representative of a specified classification;
   automatically classifying the candidate electronic document under the specified classification when the degree of visual similarity exceeds a predetermined threshold and, in response to the degree of visual similarity exceeding the predetermined threshold, converting the reference electronic document to a reference image; and
   determining an efficiency of the classifying by comparing a number of candidate electronic documents that are automatically classified under the specified classification to a number of candidate electronic documents that a user classifies under the specified classification.

12. The method of claim 11, further comprising:
   presenting information regarding the reference image to a user, wherein the reference image is stored in a black list database, the presenting including generating a graphical user interface, the graphical user interface displaying a thumbnail image of the reference image, an identifier of the reference image, a date that the reference image was added to the black list database, and an expiration date of the reference image, the graphical user interface further including components for allowing the user to selectively perform at least one of: deleting the reference image and changing the expiration date of the reference image.

13. The method of claim 11, wherein the reference electronic document is one of a plurality of reference electronic documents, each representative of the specified classification, each of which having been converted to a respective reference image; and wherein a representation of the degree of visual similarity of each of the respective reference images to the entire scaled candidate image is obtained; and in a case where the degree of visual similarity exceeds a predetermined threshold with respect to any one of the respective reference images, classifying the candidate electronic document under the specified classification.

14. The method of claim 11, wherein the candidate electronic document and the reference electronic document are email messages and wherein the specified classification corresponds to unsolicited email messages.

15. The method of claim 11, further comprising:
   reducing a resolution of the candidate image to a point where the character data becomes illegible.

16. The method of claim 11, further comprising:
   reducing a color depth of the candidate image to a grayscale image.

17. The method of claim 11, wherein the obtaining a representation of the degree of visual similarity further comprises:
   deriving shape or texture descriptors of the entire scaled candidate image and comparing the shape or texture descriptors of the entire scaled candidate image to respective shape or texture descriptors of the reference image.

18. The method of claim 17, wherein the deriving shape or texture descriptors of the entire scaled candidate image further comprises:
   deriving an edge histogram of the entire scaled candidate image, and wherein the comparing further comprises comparing the edge histogram of the entire scaled candidate image with an edge histogram of the reference image.

* * * * *